Sept. 27, 1960     E. M. GREER     2,954,199
RESILIENT SUPPORT FOR PRESSURE ACCUMULATOR
Filed Nov. 7, 1957
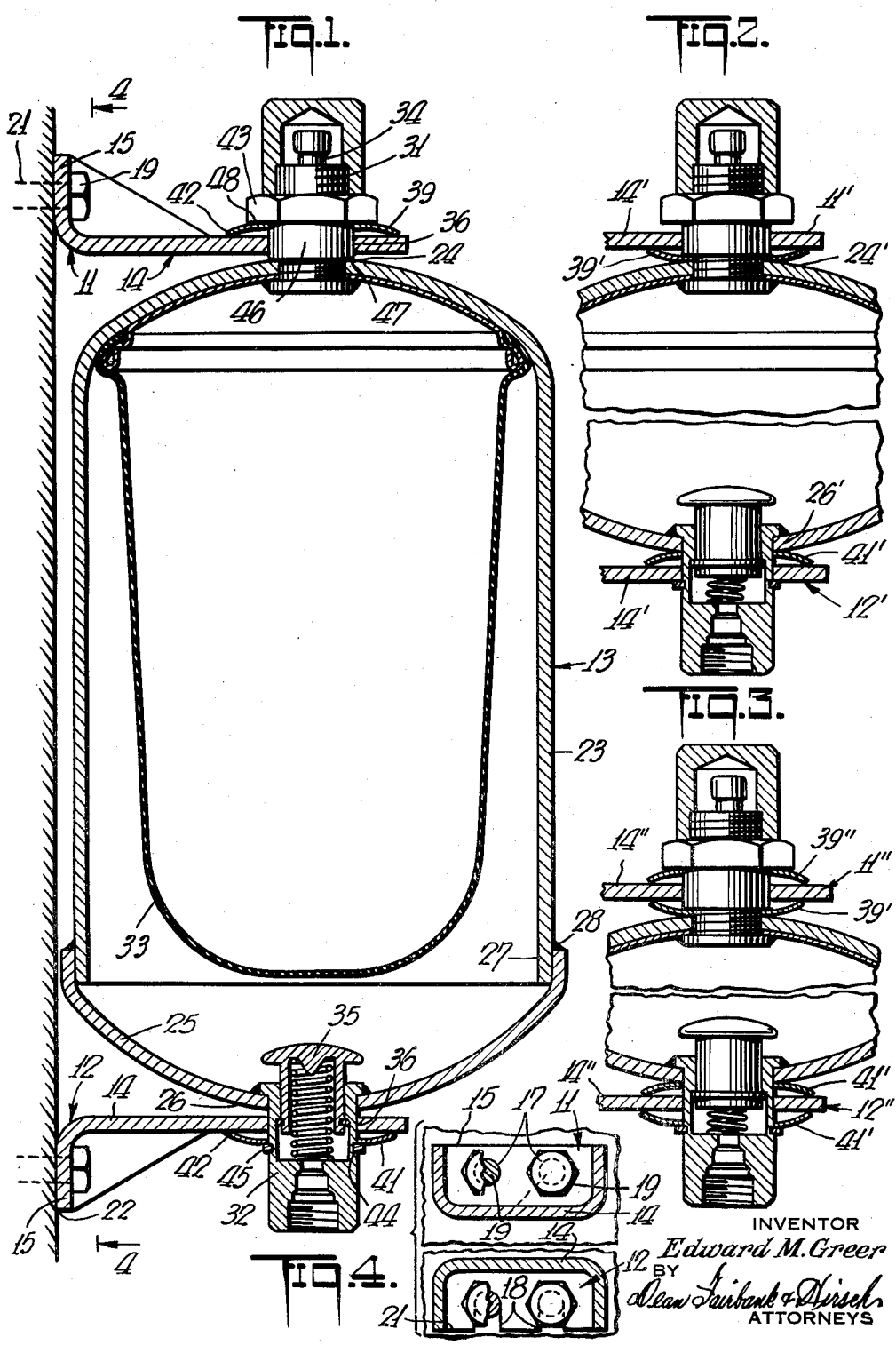
INVENTOR
*Edward M. Greer*
BY
*Dean Fairbank & Hirsch*
ATTORNEYS

United States Patent Office 2,954,199
Patented Sept. 27, 1960

2,954,199

RESILIENT SUPPORT FOR PRESSURE ACCUMULATOR

Edward M. Greer, Great Neck, N.Y., assignor to Greer Hydraulics, Inc., a corporation of New York Filed Nov. 7, 1957, Ser. No. 695,106

4 Claims. (Cl. 248—201)

It is among the objects of the invention to provide a support for a pressure accumulator, which support has but few simple parts that may readily be fabricated at low cost and which when counted on a vehicle or other equipment that is subject to shock or vibration, will securely retain such accumulator in position yet will minimize shock thereto transmitted from the vehicle or other equipment to prevent injury to the accumulator with resultant malfunctioning thereof.

According to the invention, these objects are accomplished by the arrangement and combination of elements hereinafter described and particularly recited in the claims.

In the accompanying drawings in which are shown one or more of various possible embodiments of the several features of the invention, Fig. 1 is a side elevational view of one embodiment of the invention, Figs. 2 and 3 are fragmentary side elevational views of other embodiments of the invention, and Fig. 4 is a sectional view with parts broken away taken along line 4—4 of Fig. 1.

Referring now to the drawings, the resilient support comprises a pair of brackets 11 and 12 which serve to mount a pressure accumulator 13. Each of the brackets is substantially L-shaped and has a pair of arms 14 and 15, the latter being secured to the frame of an automobile, for example, so that the arms 14 will extend outwardly therefrom in spaced parallel relation, to support the accumulator 13 in vertical position therebetween.

In order to permit ready removal of the accumulator for maintenance, the brackets 11 and 12 are removably mounted to the frame. For this purpose, the arms 15 of brackets 11 and 12 respectively, have a plurality of openings 17 and slots 18 each accommodating a bolt 19 which is screwed into a correspondingly threaded opening 21 in the frame. The slots 18 are elongated and desirably extend through the lower edge 22 of the arm 15 of bracket 12 so that accumulators varying slightly in length may be accommodated between the brackets 11 and 12 affixed to the frame.

The accumulator 13, illustratively is of the type shown and described in co-pending application Serial No. 410,921, filed February 17, 1954, now Patent No. 2,886,064, having a cylindrical shell 23 rounded at one end as at 24 and having a substantially cup-shaped cap 25 which forms the other end 26 of the accumulator. The cap 25 is desirably rounded and is affixed to the end 27 of the shell 23 as by welding at 28. As the construction of the accumulator 13 per se forms no part of the invention, it will not be described in detail.

Extending axially from the opposed ends 24, 26 of the accumulator 13 are stems 31, 32 which respectively provide communication to the deformable bladder 33 and to the interior of the accumulator for charging thereof with gas and liquid under pressure through suitable valves 34 and 35 in said stems respectively.

The stems 31 and 32 extend through longitudinally aligned openings 36 in the arms 14 of brackets 11 and 12 and the length of the body of the accumulator 13, excluding the stems 13 and 32, is slightly less than the distance between the arms 14 of said brackets 11 and 12 when the latter are affixed to the frame as is clearly shown in Fig. 1.

Means are provided to secure the accumulator 13 between the arms 14 of the brackets so that it will be resiliently supported therebetween.

To this end as is shown in Fig. 1, resilient members, which may be coil springs, but preferably are "Belleville" spring washers 39, 41, encompass the portion of each of the stems 31 and 32 extending beyond the opening 36 in the associated arm 14, the springs 39, 41 being positioned with their outer peripheries 42 against the associated arm 14.

Although the springs 39, 41 may be retained in slightly compressed condition against the associated arm 14, in any suitable manner, as illustratively shown in Fig. 1, the stem 31 is externally threaded to receive a nut 43 and the stem 32 has an annular groove 44 in which a snap ring 45 is positioned.

The nut 43 has a cylindrical portion 46 of reduced diameter forming a shoulder 47 which will abut against the end 24 of the accumulator 13 when the nut 43 is tightened. The thickness of cylindrical portion 46 is greater than that of arm 14 of bracket 11 so that the "Belleville" spring 39, for example, may be accommodated in slightly compressed condition between the arm 14 and shoulder 48 formed between the head of the nut and cylindrical portion 46. Similarly, the distance between the end 26 of the accumulator from which stem 32 extends and the annular groove 44 is greater than the thickness of arm 14 of bracket 12, so that the "Belleville" spring 41 may be accommodated between arm 14 and snap ring 45 also in slightly compressed condition.

As the length of the body of the accumulator 13, excluding the stems 31, 32, is slightly less than the distance between arms 14 of brackets 11 and 12 when affixed to the frame, it is apparent that the accumulator will be capable of slight axial movement between such arms against the force exerted by the spring 39, 41.

In the initial installation of the accumulator 13 between the brackets 11 and 12, after the stems 31, 32 are positioned in the associated openings 36 in arms 14, the accumulator 13 is substantially centered between such arms by suitable wedges inserted between the arms 14 and the respective ends 24, 26 of the accumulator. Thereupon the springs 39, 41 are positioned over the stems 31 and 32 and the nut 43 screwed on stem 31 and the snap ring 45 positioned in the groove 44 in stem 32 so as to retain the springs 39, 41 in slightly compressed condition against the associated arm 14.

In the embodiment shown in Fig. 2, the "Belleville" springs 39', 41' are positioned between the ends 24', 26' of the accumulator and the associated arms 14' of brackets 11' and 12' and in the embodiment shown in Fig. 3, "Belleville" springs 39', 39'' and 41', 41'' are positioned on both sides of the arms 14'' of the brackets 11'' and 12''.

With the constructions above described, as the vehicle moves along and is subject to shock which will cause vibration thereof in a vertical plane, by reason of the springs associated with the accumulator 13, slight axial movement of the latter is permitted which will prevent undue shock to the accumulator 13 which might cause opening of the welded joint 28 for example, or injury to the valves in the stems 31 and 32.

As many changes could be made in the above construction and many apparently widely different embodiments of this invention could be made without departing from the scope of the claims, it is intended that all matter contained in the above description, or shown in the accompanying drawings shall be interpreted as illustrative and not in a limiting sense.

Having thus described my invention, what I claim as new and desire to secure by Letters Patent of the United States is:

1. A support for mounting on a rigid frame a pressure vessel having axially aligned ports, each with a valve stem extending outwardly therefrom, said valve stems being axially aligned, said support comprising a pair of brackets each having an arm, means for mounting said brackets on such frame with said arms extending outwardly therefrom at right angles thereto, each of said arms having an opening substantially aligned when said brackets are mounted on said frame through which said valve members respectively may extend, and a "Belleville" spring member encompassing the portion of each of said valve stems extending beyond its associated arm, means on each of said valve stems to retain said "Belleville" spring against the outer surface of the associated arm whereby said spring reacts against an associated arm resiliently to retain said vessel between said arms and spaced therefrom to afford slight axial movement of said device therebetween against the force exerted by said resilient means.

2. The combination set forth in claim 1 in which the means to retain the "Belleville" spring members against the outer surface of the associated arm comprises a nut screwed on one of said valve stem members and a snap ring affixed to the other valve member stem.

3. The combination set forth in claim 1 in which a pair of "Belleville" spring encompasses said valve stem members on both side of each associated arm.

4. The combination set forth in claim 1 in which the means for mounting said brackets is a second arm rigid with said first arm and extending at right angles therefrom, said second arms each having openings therethrough to receive a bolt, the openings in one of said second arms being elongated and aligned with the openings in the other of said second arms.

References Cited in the file of this patent

UNITED STATES PATENTS

| 521,374 | Keene | June 12, 1894 |
| 1,839,666 | Flegel | Jan. 5, 1932 |
| 2,575,858 | Bennett | Nov. 20, 1951 |

FOREIGN PATENTS

| 118,058 | Switzerland | Dec. 16, 1926 |
| 604,073 | France | Jan. 16, 1926 |